Figure 1:
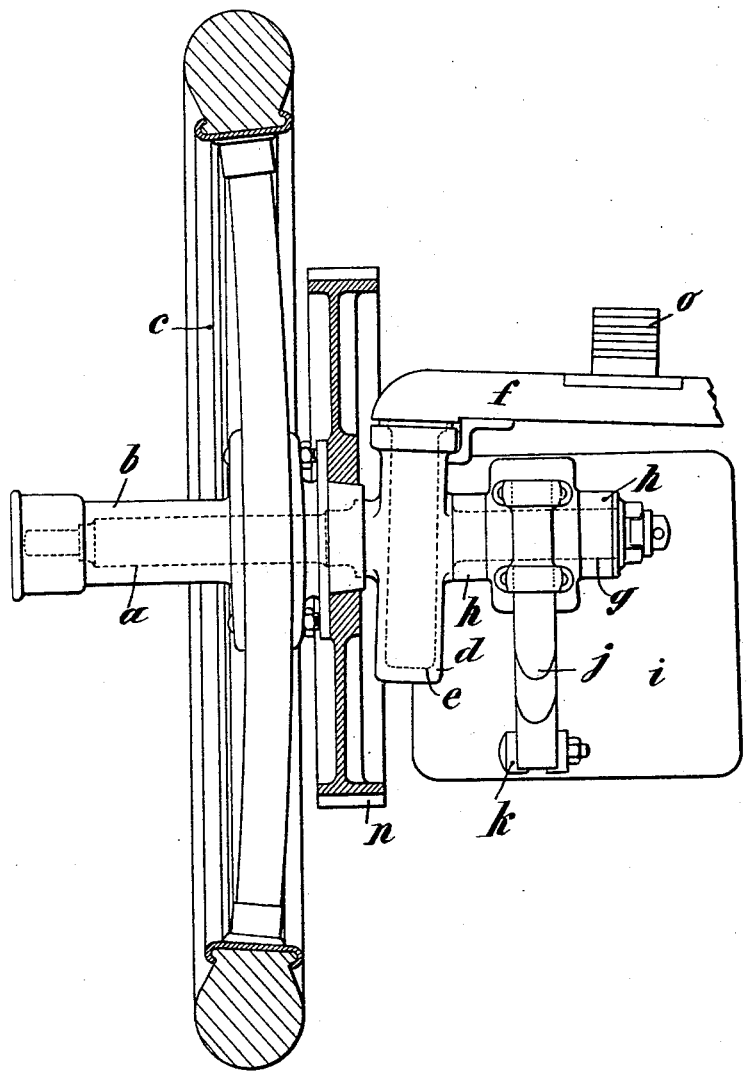

No. 633,763. Patented Sept. 26, 1899.
L. KRIEGER.
MOTOR VEHICLE.
(Application filed Aug. 1, 1899.)
(No Model.) 2 Sheets—Sheet 1.

WITNESSES:

INVENTOR
Louis Krieger
BY
ATTORNEYS

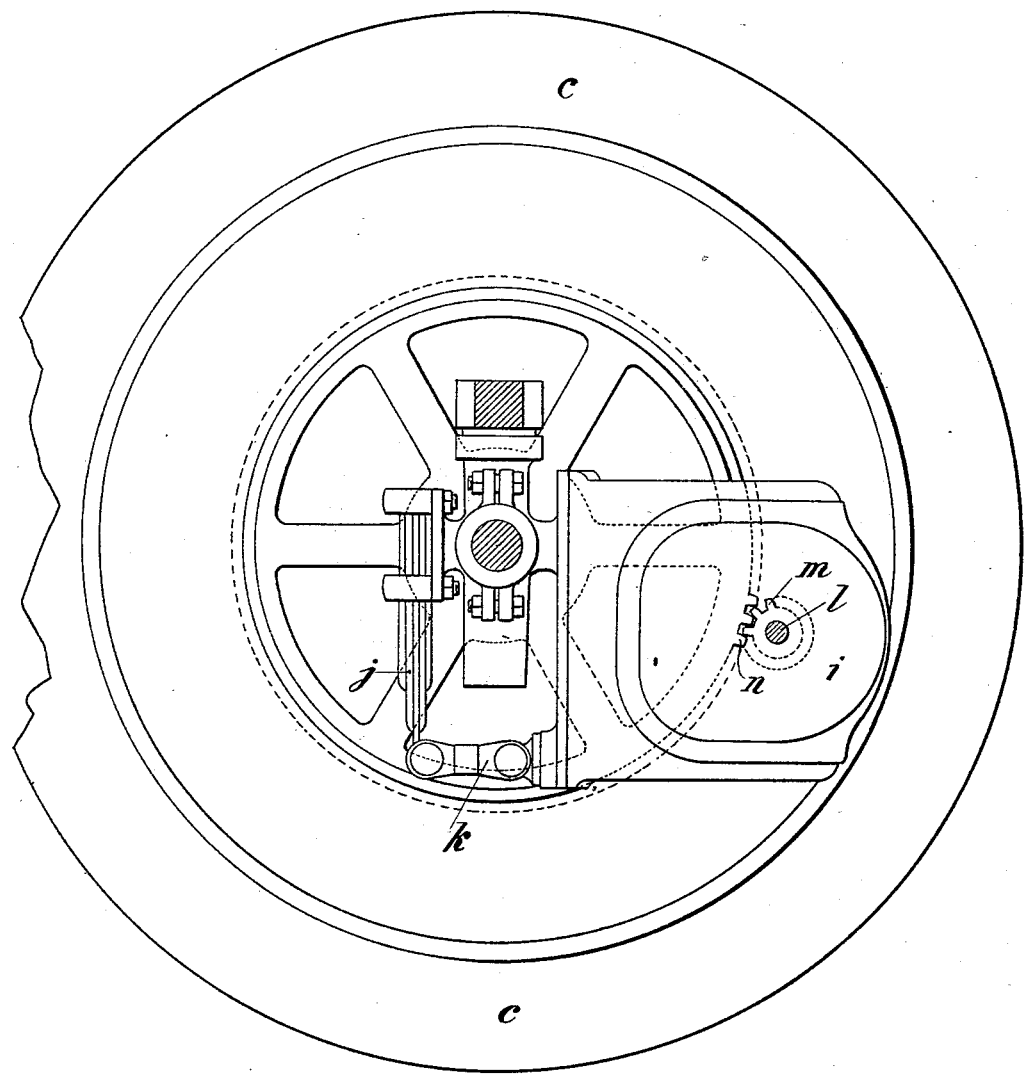

UNITED STATES PATENT OFFICE.

LOUIS KRIEGER, OF PARIS, FRANCE.

MOTOR-VEHICLE.

SPECIFICATION forming part of Letters Patent No. 633,763, dated September 26, 1899.

Application filed August 1, 1899. Serial No. 725,789. (No model.)

*To all whom it may concern:*

Be it known that I, LOUIS KRIEGER, engineer, of 122 Avenue de Villiers, in the city of Paris, Republic of France, have invented Improvements in and Relating to the Mounting of Motors on Vehicles, of which the following is a full, clear, and exact description.

My invention relates to an improved method of mounting electromotors in fore-carriages of vehicles, in which the wheel-axles are independently pivoted to the fore-carriage to permit of steering the wheel.

My invention consists, essentially, in mounting each motor on a false or supplementary axle arranged as a prolongation of the axle of the corresponding wheel and connecting the said motor to the end of a spring secured to this false or supplementary axle, so that the motor resting against this spring can pivot or oscillate on the false axle, supporting it in accordance with the differences of effort exerted on the gearing, and will at the same time be protected by the flexion of the spring from the action of direct shocks proceeding from irregularities of the road.

In the accompanying drawings I have shown by way of example only my improved method of mounting.

Figure 1 shows in front elevation, and Fig. 2 in side elevation, part of a pivoted fore-carriage having a group motor mounted thereon according to my said invention.

In both figures like letters of reference indicate corresponding parts.

As well as the group motor illustrated, Fig. 1 shows an axle $a$, on which turns the hub $b$ of the wheel $c$. The said axle $a$ carries a sleeve or socket $d$, which receives a pivot $e$ on the axletree of the fore-carriage $f$. The said axle $a$ is, moreover, prolonged by a false or supplementary axle $g$, in axial alinement therewith. On the false axle $g$ are mounted two collars $h$, which form part of the frame of the motor $i$. These two collars form a bearing and enable the motor to oscillate freely about the axle $g$. Between the two collars $h$ is fixed, on the false axle $g$, a carriage-spring or leaf-spring $j$, to the end of which the motor $i$ is connected by means of a link $k$. The shaft $l$ of the motor bears a pinion $m$, engaging with a toothed wheel $n$, fixed on the hub $b$ of the wheel $c$. The body of the vehicle rests on the spring $o$, which is supported by the axletree of the fore-carriage $f$. Under these conditions when differences of effort are produced on the gearing the motor $i$, resting against the end of the spring $j$, can move around the axis $g$, and, moreover, by the flexion of the spring $j$ this motor is completely protected from direct shocks due to irregularities of the road.

It is obvious that my improved method of mounting and the accessory arrangements can be somewhat varied according to the various applications.

I claim—

An electromotor mounted on a false or supplementary axle arranged as a prolongation of the wheel-axle of a vehicle and connected with the said false or supplementary axle by means of a spring, so that the said motor is capable of angular movement about the axis which carries it when differences of effort are produced on the gearing, and is protected against shocks or jars, substantially as hereinbefore described with reference to the accompanying drawings, and for the purposes specified.

The foregoing specification of my improvements in and relating to the mounting of motors on vehicles signed by me this 19th day of July, 1899.

LOUIS KRIEGER.

Witnesses:
EDWARD P. MACLEAN,
MAURICE H. PIGNET.